(12) United States Patent
Ruan et al.

(10) Patent No.: US 7,825,371 B2
(45) Date of Patent: Nov. 2, 2010

(54) MULTICHANNEL ANALYZER AND METHOD FOR REAL-TIME CORRECTION OF PEAK SHIFT

(75) Inventors: Ming Ruan, Beijing (CN); Yingrong Jian, Beijing (CN); Kun Zhao, Beijing (CN); Yali Xie, Beijing (CN); Jin Lin, Beijing (CN)

(73) Assignee: Nuctech Company Limited, Beijing (CN)

( * ) Notice: Subject to any disclaimer, the term of this patent is extended or adjusted under 35 U.S.C. 154(b) by 139 days.

(21) Appl. No.: 12/342,592

(22) Filed: Dec. 23, 2008

(65) Prior Publication Data

US 2009/0166539 A1 Jul. 2, 2009

(30) Foreign Application Priority Data

Dec. 29, 2007 (CN) .................. 2007 1 0308547

(51) Int. Cl.
*G01D 18/00* (2006.01)
(52) U.S. Cl. .................................. 250/252.1
(58) Field of Classification Search ............. 250/252.1, 250/361 R, 370.06, 370.11
See application file for complete search history.

(56) References Cited

U.S. PATENT DOCUMENTS 3,101,409 A 8/1963 Fite
4,272,677 A * 6/1981 Berthold et al. .......... 250/252.1
6,064,068 A 5/2000 Bartle
2004/0000645 A1 * 1/2004 Ramsden et al. ........ 250/361 R

FOREIGN PATENT DOCUMENTS

CN 1004302 5/1989

OTHER PUBLICATIONS

International Search Report dated Apr. 2, 2009 issued in corresponding PCT Application No. PCT/CN2008/002059.
Wang, G.X. et al. A spectrum-stabilization technique research for NaI (TI) scintillation spectrometer. China geophysics 2006.2006, p. 235.

* cited by examiner

*Primary Examiner*—David P Porta
*Assistant Examiner*—Marcus H Taningco
(74) *Attorney, Agent, or Firm*—Kenyon & Kenyon LLP

(57) ABSTRACT

The invention provides a multichannel analyzer for use in a multichannel spectrometer, which comprises a standard spectrum calibrator for obtaining energy calibration parameters of said multichannel spectrometer; an environment background spectrum calibrator for obtaining parameters of a current and a previous environment background spectrum; a peak shift detector for analyzing the parameters of the current and previous environment background spectrum to determine whether a peak shift occurs between them and to determine a correction coefficient of the peak shift; and a parameter corrector for correcting the energy calibration parameters of said multichannel spectrometer using said peak shift correction coefficient. The invention also provides a method for correcting a peak shift of a multichannel spectrometer adapted in the multichannel analyzer. The method for correcting and the multichannel analyzer can correct and monitor the peak shift of the multichannel spectrometer in real time.

15 Claims, 2 Drawing Sheets

MULTICHANNEL ANALYZER AND METHOD FOR REAL-TIME CORRECTION OF PEAK SHIFT

RELATED APPLICATION

This application claims priority to Chinese Patent Application No. 200710308547.8, filed Dec. 29, 2007, which is incorporated herein by reference in its entirety.

TECHNICAL FIELD

This invention relates to the technical field of the detection of radioactive substance radiation and nuclide identification, in particular to a method of performing real-time correction of peak shift of a multichannel spectrometer, particularly a NaI multichannel spectrometer, and a multichannel analyzer using this method.

BACKGROUND TECHNOLOGY

A multichannel spectrometer is a device comprising a scintillation crystal, a multiplier phototube, an electronics amplifier and a multichannel analyzer, for detecting various kinds of radiation rays and performing nuclide identification. The basic principle of the multichannel spectrometer lies in that: the scintillation crystal absorbs (or partially absorbs) the radiation rays, emits light and focuses the light into the multiplier phototube which performs a photo-electric conversion of the light, and linearly multiplies the converted electric signal into an electric pulse; the electronics amplifier shapes and amplifies the electric pulse, and transfers the processed electric pulse to the multichannel analyzer which analyzes the electric pulse and converts it into a digital signal. The above process is a process of linear amplification and conversion, thus, the multichannel analyzer can be used to detect a spectrum of incident radiation rays and perform nuclide identification.

Among the scintillation crystals, the NaI scintillation crystal is still the most broadly used scintillation crystal due to its high light yield, high detection efficiency and good energy resolution. Therefore, a NaI multichannel spectrometer comprising a NaI scintillation crystal is an important tool for monitoring radioactive substance, and identifying and analyzing nuclide.

However, in a NaI multichannel spectrometer, luminous efficiency and light transmission efficiency of the NaI scintillation crystal, performance of the multiplier phototube, gain of the amplifier, stability of the high voltage, etc., are greatly affected by changes in the environmental temperature and humidity. Therefore, the shape and peak position of a radiation ray spectrum measured by the NaI multichannel spectrometer will be shifted and distorted under the influence of these environmental factors. Thus, it is generally required to recalibrate the spectrometer using a standard radioactive source.

In the prior art, recalibration is performed generally by using a method of internal calibration with a radioactive source, such as doping a small amount of radioactive nuclide in the crystal; or using light emitted by an LED to simulate the radiation rays processed in the spectrometer. In addition, there are some other existing technologies which use a characteristic peak in a natural background spectrum to perform artificial recalibration. However, all of these technologies for recalibration have a shortcoming of being unable to perform real-time monitoring of peak shift, and since the recalibration usually involves using of standard radioactive sources, it further has a problem that it requires the strict management of these standard radioactive sources.

CONTENTS OF THE INVENTION

An object of this invention is to provide a method for correcting a peak shift of a multichannel spectrometer which can conveniently achieve real-time correction of the peak shift of the multichannel spectrometer, particularly a NaI multichannel spectrometer, and a multichannel analyzer using this method.

The applicant has noted that under a stable geometric and spatial condition, a spectrum profile and a characteristic peak of a natural background spectrum and a natural radioactive element in an environment (hereinafter both of them are together referred to as an environment background spectrum) are relatively stable. The applicant makes this invention using the feature of a relatively stable environment background spectrum.

According to one aspect of this invention, there is provided a method for real-time correction of peak shift of a multichannel spectrometer, said method comprising: obtaining energy calibration parameters of said multichannel spectrometer; obtaining parameters of a current and a previous environment background spectrum; analyzing the parameters of the current and previous environment background spectrum to determine whether the peak shift occurs between them and to determine a correction coefficient of the peak shift; and correcting the energy calibration parameters of said multichannel spectrometer using said correction coefficient of the peak shift.

The method for correcting the peak shift of the multichannel spectrometer preferably further comprises steps of obtaining an environmental temperature correction coefficient of the multichannel spectrometer based on the variation relationship between the energy calibration parameters of said multichannel spectrometer and environmental temperatures, and further correcting the energy calibration parameters of said multichannel spectrometer using the environmental temperature correction coefficient of the multichannel spectrometer.

According to one aspect of this invention, there is provided a multichannel analyzer for use in a multichannel spectrometer for real-time correction of a peak shift of the multichannel spectrometer, said multichannel analyzer comprises a standard spectrum calibrator for obtaining energy calibration parameters of said multichannel spectrometer; an environment background spectrum calibrator for obtaining parameters of a current and a previous environment background spectrum; a peak shift detector for analyzing the parameters of the current and previous environment background spectrum to determine whether a peak shift occurs between them and to determine a correction coefficient of the peak shift; and a parameter corrector for correcting the energy calibration parameters of said multichannel spectrometer using said peak shift correction coefficient.

Said multichannel spectrometer is preferably a NaI multichannel spectrometer.

Said multichannel analyzer preferably further comprises a temperature coefficient detector for obtaining an environmental temperature correction coefficient of multichannel spectrometer based on a variation relationship between the energy calibration parameters of said multichannel spectrometer and environmental temperatures, and further correcting the energy calibration parameters of said multichannel spectrometer using the environmental temperature correction coefficient of the multichannel spectrometer.

The method for correcting a peak shift of a multichannel spectrometer and the multichannel analyzer according to this invention can thus achieve real-time monitoring and correction of the peak shift of the multichannel spectrometer by performing real-time correction of position shift of energy peak of the NaI multichannel spectrometer caused by various reasons, so that said multichannel spectrometer can be normally operated in an environment of poor conditions. In addition, since the method for correcting the peak shift of the multichannel spectrometer and the multichannel analyzer according to this invention do not involve using of standard radioactive sources during the peak shift correction, difficulties caused by inconvenient management of the radioactive sources can be reduced.

DESCRIPTION OF FIGURES

These and other aspects of a method of peak shift correction of a multichannel spectrometer and a multichannel analyzer according to this invention will become apparent from and will be elucidated with respect to the implementations and embodiments described thereinafter and with reference to the accompanying drawings, wherein.

SPECIFIC EMBODIMENTS

Figure 1:
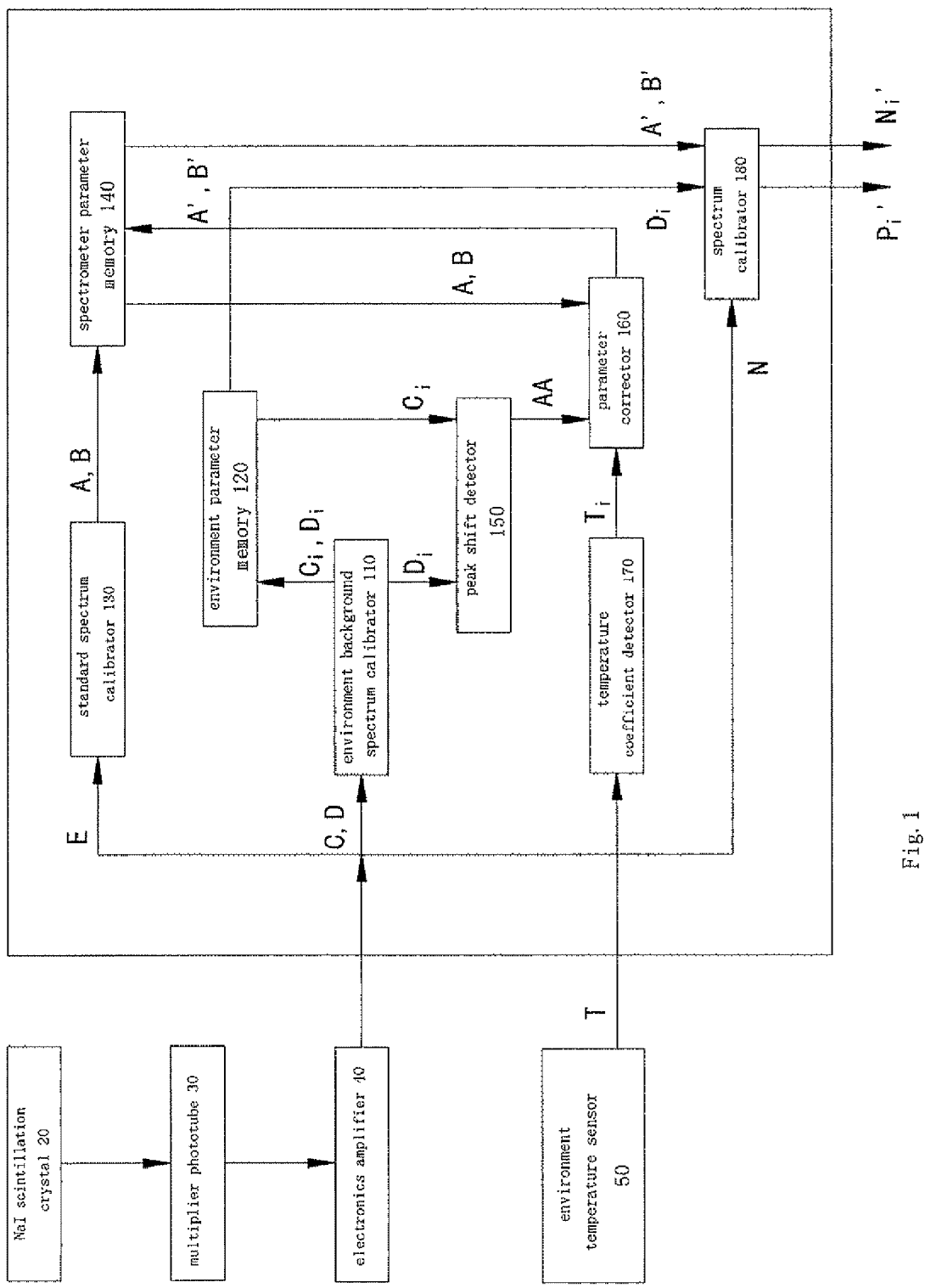
FIG. 1 shows a diagram of a multichannel spectrometer according to an embodiment of this invention.

FIG. 1 shows a multichannel spectrometer 10 according to an embodiment of this invention. Similar to a traditional multichannel spectrometer, the multichannel spectrometer 10 comprises a NaI scintillation crystal 20, a multiplier phototube 30, an electronics amplifier 40 and a multichannel analyzer 40. For the purpose of conciseness, functions of components in the multichannel spectrometer 10 which are same as those of corresponding components in a traditional multichannel spectrometer will not be illustrated here, whereas only those functions relevant to this invention will be described in detail.

The multichannel spectrometer 10 further comprises an environment temperature sensor 50 for obtaining current environmental temperatures and providing them to the multichannel analyzer 40.

The multichannel analyzer 40 comprises a standard spectrum calibrator 130, a spectrometer parameter memory 140, an environment background spectrum calibrator 110, an environment parameter memory 120, a peak shift detector 150, a parameter corrector 160, a temperature coefficient detector 170, and a spectrum calibrator 180.

The standard spectrum calibrator 130 uses standard radioactive sources to perform energy calibration of the multichannel spectrometer so as to obtain energy calibration parameters of said multichannel spectrometer: $Ei=A*i+B$, $i=1, 2, 3, \ldots 1024$; wherein i represents the number of multiple channels, Ei represents energy of the i-th channel, A and B represent energy calibration coefficients. The standard spectrum calibrator 130 stores the obtained energy calibration coefficients A and B into the spectrometer parameter memory 140, in addition to the energy parameters A and B obtained from the energy calibration performed by the standard spectrum calibrator 130, energy parameters A' and B' corrected by the parameter corrector 160 are also stored in the spectrometer parameter memory 140.

The environment background spectrum calibrator 110 obtains a background spectrum D of the current environment, and performs energy calibration of said background spectrum D, $Di=A*i+B$, $i=1, 2, 3, \ldots 1024$; wherein i represents the number of multiple channels, Di represents energy of the i-th channel (which together are referred to as parameters of the background spectrum), and A and B represent energy calibration coefficients. The environment background spectrum calibrator 110 further obtains a characteristic energy peak of natural radioactive nuclide in the environment background spectrum D, such as PEAK40K, and stores these parameters, such as Di, PEAK40K, etc., into the environment parameter memory 120. In addition to the parameters of the current background spectrum D, the environment parameter memory 120 also stores a parameter Ci of a background spectrum C previously obtained by the environment background spectrum calibrator 110.

The environment background spectrum calibrator 110 regularly performs energy calibration of the background spectrum D of the current environment to obtain the background spectrum parameter Di, and provides the obtained background spectrum parameter Di to the peak shift detector 150. In addition to receiving the background spectrum parameter Di, the peak shift detector 150 also obtains from the environment parameter memory 120 the previously stored background spectrum parameter Ci, the parameters Di and Ci are correspondingly processed to determine whether peak shift occurs between the current background spectrum D and the previous background spectrum C. If it does, a correction coefficient AA of the peak shift is determined based on the characters of the peak shift (such as displacement of the peak shift, amplitude, etc.), and the determined correction coefficient of the peak shift is provided to the parameter corrector 160 so as to correct the energy calibration parameters A and B.

A detailed process of the peak shift detector 150 is as follows: firstly, fitting Di with Ci to obtain a minimum residual spectrum Bi, $i=1, 2, 3, \ldots 1024$; performing peak-detection of the residual spectrum Bi, e.g., by using an Second Derivative Method; determining whether there exists a peak or not in a known characteristic energy peak area (such as PEAK40K) of the residual spectrum; if there does not exist a peak (within a certain threshold), said spectrometer is deemed as not having a shift; otherwise, said spectrometer is deemed as having a shift, and there should exist a similar negative-phase peak near said peak; searching said negative-phase peak and determining a correction coefficient AA of the peak shift by determining such difference information as the displacement between two peaks and change in the amplitude.

The parameter corrector 160 receives the coefficient AA of the peak shift provided by the peak shift detector 150, and corrects the energy calibration parameters A and B using said coefficient AA of peak shift correction to obtain the corrected energy calibration parameters A' and B'.

Optionally, according to a variation relationship between the energy calibration parameters of said multichannel spectrometer and environmental temperatures, the temperature coefficient detector 170 determines an environmental temperature correction coefficient Ti of the multichannel spectrometer according to the environmental temperature information from the environmental temperature sensor 50. The parameter corrector 160 can further correct the energy calibration parameters A and B according to the environmental temperature correction coefficient Ti of the multichannel spectrometer from the temperature coefficient detector 170.

The parameter corrector 160 stores the corrected energy calibration parameters A' and B' into the spectrometer parameter memory 140 to be used in subsequent radiation ray detection using said multichannel spectrometer.

The spectrum calibrator 180 recalibrates the background spectrum Di and a subsequently measured spectrum Ni by using the corrected energy calibration parameters A' and B', thereby obtains a background spectrum Di' and a spectrum Ni' after the peak shift correction.

In this way, it can be determined whether the peak shift occurs or not by regularly performing energy calibration of the background spectrum D of the current environment by means of the environment background spectrum calibrator 110 and comparing it with the previously stored environment background spectrum C. Moreover, in the case of occurrence of the peak shift, the energy calibration parameters A and B stored in the spectrometer parameter memory 140 are corrected to ensure accuracy of the spectrometer measurement.

In addition, each time when performing the radiation ray measurement by means of the multichannel spectrometer, the energy calibration of the environment background spectrum can be performed by the environment background spectrum calibrator 110, thereby achieving a real-time monitoring and correction of the peak shift.

Figure 2:
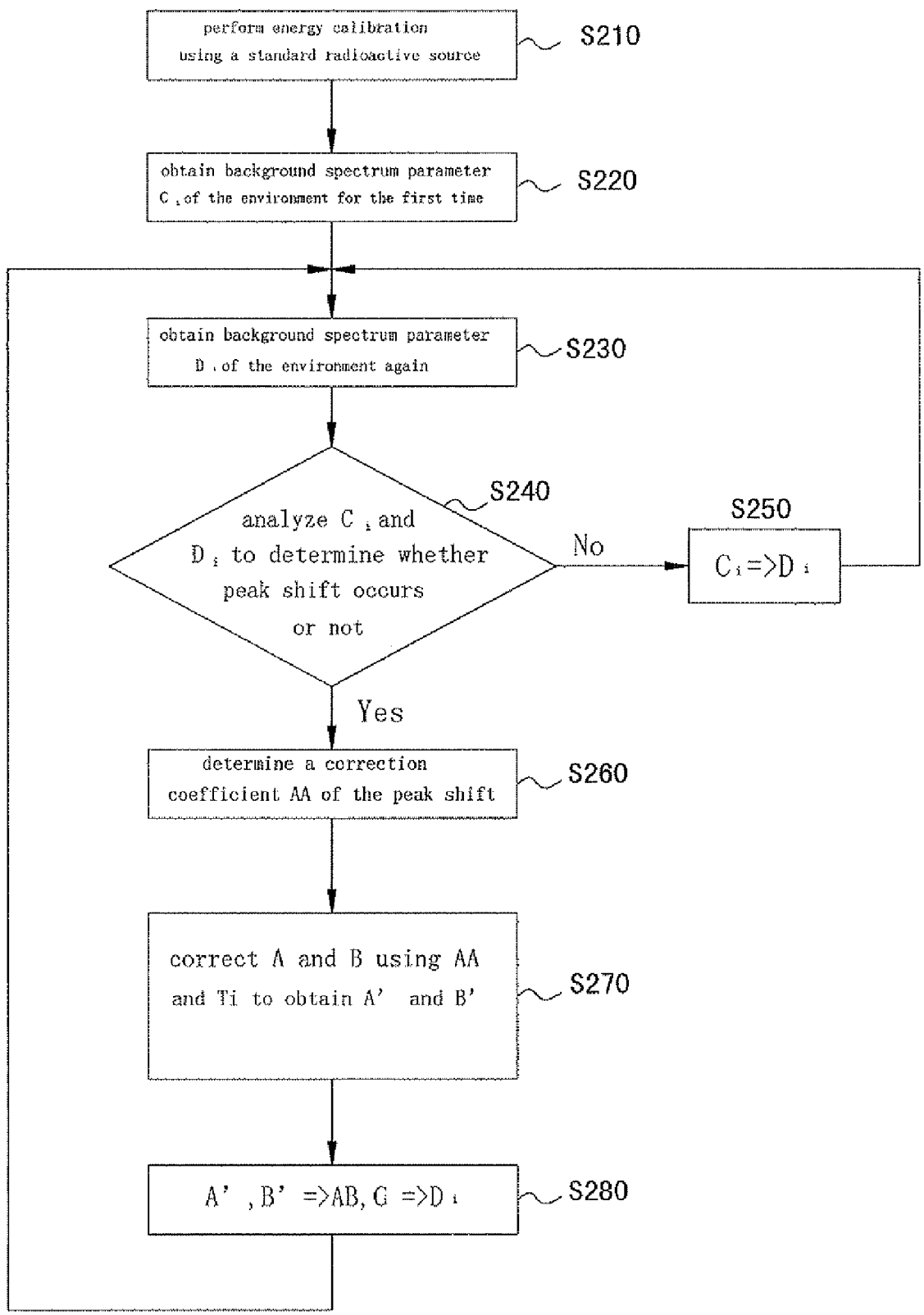
FIG. 2 shows a flow chart of a method for correcting a peak shift of a multichannel spectrometer according to an embodiment of this invention.

FIG. 2 shows a flow chart of a method for correcting a peak shift of a multichannel spectrometer according to an embodiment of this invention. In step S210, an energy calibration of a multichannel spectrometer is performed in the standard spectrum calibrator 130 to obtain energy calibration parameters A and B of said multichannel spectrometer using a standard radioactive source, and the obtained energy calibration parameters A and B are stored into the spectrometer parameter memory 140. In step S220, a background spectrum C in a current environment is measured, and the energy calibration of the background spectrum C is performed to obtain a background spectrum parameter Ci using the environment background spectrum calibrator 110. Subsequently, after a certain time interval, in step S230, a background spectrum D in a current environment at that time is measured again, and the energy calibration of the background spectrum D is performed again to obtain a parameter Di of a background spectrum using the environment background spectrum calibrator 110. In step S240, the parameter Di of currently obtained background spectrum and the parameter Ci of previously obtained background spectrum are analyzed to determine whether a peak shift occurs or not. If the peak shift does not occur, the background spectrum parameter Di is stored in step S250 as the previous background spectrum parameter Ci, and the processing returns to step S230 for further processing. Certainly, since the peak shift does not occur, step S250 can be neglected. If a peak shift does occur, a correction coefficient AA of the peak shift is determined in step S260, and in step S270, the energy calibration parameters A and B are corrected using the determined correction coefficient AA of the peak shift and an environmental temperature correction coefficient Ti of the multichannel spectrometer to obtain corrected energy calibration parameters A' and B' for use in subsequent radiation ray measurements. Subsequently, in step S280, the corrected energy calibration parameters A' and B' and the background spectrum parameter Di are stored, and the process returns to the step S230 to continue the monitoring and correction of the peak shift.

According to the above technical solution, all multichannel spectrometer detecting systems including the NaI multichannel spectrometer detecting system, as long as they use the environment background spectrum to perform real-time and non-real-time peak shift correction, belong to the protection scope of this invention.

According to the above technical solution, all radiation ray (X-rays, neutrons, charged particles) spectrometer detecting systems, as long as they use the environment background spectrum to perform real-time and non-real-time peak shift correction, belong to the protection scope of this invention.

Embodiments of the present invention may be implemented in hardware, or as software modules running on one or more processors, or in a combination thereof. That is, those skilled in the art will appreciate that a microprocessor or digital signal processor (DSP) may be used in practice to implement some or all of the functionality of some or all components of the multichannel analyzer according to an embodiment of the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form. In one embodiment, the result obtained by the method is output to a user, e.g., by a display.

It should be noted that the aforesaid embodiments are illustrative of this invention instead of restricting this invention, substitute embodiments may be designed by those skilled in the art without departing from the scope of the claims enclosed. In the claims, any reference symbols located between the parentheses should not constitute restrictions to the claims. The word "include" does not exclude elements or steps which are present but not listed in the claims. The word "a" or "one" preceding the elements does not exclude the presence of a plurality of such elements. This invention can be achieved by means of hardware including several different elements or by means of a suitably programmed computer. In the unit claims that list several means, several ones among these means can be specifically embodied via the same hardware item. The use of such words as first, second, third does not represent any order, which can be explained as names.

What is claimed is:

1. A multichannel analyzer for use in a multichannel spectrometer, for correcting a peak shift of the multichannel spectrometer, said multichannel analyzer comprising:

a standard spectrum calibrator for obtaining energy calibration parameters of said multichannel spectrometer;

an environment background spectrum calibrator for obtaining parameters of a current and a previous environment background spectrum;

a peak shift detector for analyzing the parameters of the current and previous environment background spectrum to determine whether a peak shift occurs between them and, if a peak shift occurs, to determine a correction coefficient of the peak shift; and a parameter corrector for correcting the energy calibration parameters of said multichannel spectrometer using said correction coefficient of the peak shift.

2. The multichannel analyzer as claimed in claim 1, wherein said peak shift detector determines said correction coefficient of the peak shift according to a displacement of the peak shift.

3. The multichannel analyzer as claimed in claim 1, wherein said peak shift detector determines whether the peak shift occurs or not using a Second Derivative Method.

4. The multichannel analyzer as claimed in any of claims 1-3, further comprising a temperature coefficient detector for further correcting the energy calibration parameters of said multichannel spectrometer by using an environmental temperature correction coefficient of the multichannel spectrometer which corresponds to an environmental temperature.

5. The multichannel analyzer as claimed in any of claims 1-3, wherein said multichannel spectrometer is a NaI multichannel spectrometer.

6. The multichannel analyzer as claimed in any of claims 1-3, further comprising a memory for storing the parameters of the current and previous environment background spectrum, and the energy calibration parameters of said multichannel spectrometer before and after the correction.

7. The multichannel analyzer as claimed in any of claims 1-3, wherein said environment background spectrum calibrator continuously obtains said parameters of current environment background spectrum, said peak shift detector continuously determines the correction coefficients of peak shift, and said parameter corrector continuously corrects energy calibration parameters of said multichannel spectrometer, such that said multichannel analyzer performs real-time correction of peak shift of a multichannel spectrometer.

8. A multichannel spectrometer, comprising the multichannel analyzer as claimed in any of claims 1-3.

9. A method for correcting a peak shift of a multichannel spectrometer, comprising steps of:
obtaining energy calibration parameters of said multichannel spectrometer;
obtaining parameters of the current and previous environment background spectrum;
analyzing the current and previous environment background spectrum parameters to determine whether a peak shift occurs between them and, if a peak shift occurs, to determine a correction coefficient of the peak shift; and
correcting the energy calibration parameters of said multichannel spectrometer using said correction coefficient of the peak shift.

10. The method as claimed in claim 9, wherein said determining the correction coefficient of the peak shift comprises determining said correction coefficient of the peak shift according to a displacement of the peak shift.

11. The method as claimed in claim 9, wherein said determining whether the peak shift occurs comprises determining whether the peak shift occurs using a Second Derivative Method.

12. The method as claimed in any of claims 9-11, further comprising a step of further correcting the energy calibration parameters of said multichannel spectrometer by using an environmental temperature correction coefficient of the multichannel spectrometer which corresponds to an environmental temperature.

13. The method as claimed in any of claims 9-11, wherein said multichannel spectrometer is a NaI multichannel spectrometer.

14. The method as claimed in any of claims 9-11, further comprising a step of storing the parameters of the current and previous environment background spectrum, and the energy calibration parameters of said multichannel spectrometer before and after the correction.

15. The method as claimed in any of claims 9-11, further comprising a step of continuously obtaining the parameters of the current environment background spectrum so as to perform the correction of the peak shift of the multichannel spectrometer in real time.

* * * * *